United States Patent
Jeong et al.

(10) Patent No.: US 10,701,463 B2
(45) Date of Patent: Jun. 30, 2020

(54) COMPACT VIDEO GENERATION DEVICE AND METHOD, AND RECORDING MEDIUM IN WHICH COMPUTER PROGRAM IS RECORDED

(71) Applicant: IUCF-HYU (INDUSTRY-UNIVERSITY COOPERATION FOUNDATION HANYANG UNIVERSITY), Seoul (KR)

(72) Inventors: Jin Ha Jeong, Yongin-si (KR); Whoi Yul Kim, Seoul (KR); Kun Woo Choi, Yongin-si (KR); Moon Soo Ra, Bucheon-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 16/315,893

(22) PCT Filed: Jun. 16, 2017

(86) PCT No.: PCT/KR2017/006329
§ 371 (c)(1),
(2) Date: Jan. 7, 2019

(87) PCT Pub. No.: WO2018/008871
PCT Pub. Date: Jan. 11, 2018

(65) Prior Publication Data
US 2019/0261066 A1    Aug. 22, 2019

(30) Foreign Application Priority Data
Jul. 8, 2016 (KR) .................. 10-2016-0087017

(51) Int. Cl.
*H04N 21/8549* (2011.01)
*G06T 7/194* (2017.01)
(Continued)

(52) U.S. Cl.
CPC ..... *H04N 21/8549* (2013.01); *G06K 9/00751* (2013.01); *G06K 9/00765* (2013.01);
(Continued)

(58) Field of Classification Search
None
See application file for complete search history.

(56) References Cited

U.S. PATENT DOCUMENTS

| 7,295,925 B2 * | 11/2007 | Breed .................. B60N 2/2863 701/301 |
| 8,514,248 B2 | 8/2013 | Peleg et al. |

(Continued)

FOREIGN PATENT DOCUMENTS

KR    10-1456652 B1    11/2014

OTHER PUBLICATIONS

International Search Report of PCT/KR2017/006329 dated Oct. 19, 2017.

*Primary Examiner* — Eileen M Adams
(74) *Attorney, Agent, or Firm* — Sughrue Mion, PLLC

(57) ABSTRACT

The present invention relates to a compact video generation device and method, and a recording medium in which a computer program is recorded. A compact video generation device according to the present invention may comprise: an object extraction unit for separating a photographed image into a background image and a foreground image and extracting objects included in the separated foreground image; an object collision calculation unit for separately generating an occupation matrix having a changed scale thereof from the foreground image, and calculating collision (Continued)

by using a calculation between occupation matrices of different objects, when a collision occurs between the extracted objects; an object rearrangement unit for rearranging the objects within a range in which no collision visually occurs; and a summary image generation unit for generating a summary image by combining the photographed background image and the rearranged objects.

19 Claims, 9 Drawing Sheets

(51) Int. Cl.
  *G06K 9/00* (2006.01)
  *H04N 21/2387* (2011.01)
  *H04N 7/18* (2006.01)
  *H04N 5/272* (2006.01)

(52) U.S. Cl.
  CPC .............. *G06T 7/194* (2017.01); *H04N 5/272* (2013.01); *H04N 7/18* (2013.01); *H04N 21/2387* (2013.01)

(56) References Cited

U.S. PATENT DOCUMENTS

| | | |
|---|---|---|
| 2010/0092037 A1 | 4/2010 | Peleg et al. |
| 2011/0206282 A1* | 8/2011 | Aisaka .................... G06T 11/60 382/195 |
| 2016/0133297 A1* | 5/2016 | Thornton ................ H04N 7/18 386/230 |

* cited by examiner

VIDEO BEFORE SUMMARIZING

VIDEO AFTER SUMMARIZING

VIDEO BEFORE SUMMARIZING

SUMMARIZED VIDEO IN WHICH
IMPORTANCE IS NOT TAKEN
INTO CONSIDERATION

SUMMARIZED VIDEO IN WHICH
SIZES OF OBJECTS HAVE BEEN ADJUSTED
IN CONSIDERATION OF IMPORTANCE

VIDEO BEFORE SUMMARIZING

SUMMARIZED VIDEO IN WHICH NUMBER OF OBJECTS IS NOT TAKEN INTO CONSIDERATION

SUMMARIZED VIDEO IN WHICH SIZES OF OF OBJECTS HAVE BEEN ADJUSTED IN CONSIDERATION OF NUMBER OF OBJECTS

COMPACT VIDEO GENERATION DEVICE AND METHOD, AND RECORDING MEDIUM IN WHICH COMPUTER PROGRAM IS RECORDED

TECHNICAL FIELD

The present invention relates to an apparatus and method for generating a compact video and a recording medium on which a computer program is recorded, and more particularly, to an apparatus and method for generating a compact video and a recording medium on which a computer program is recorded in which a foreground and a background are separated from a surveillance video obtained through a surveillance camera, objects which correspond to the foreground are temporally rearranged, wherein the objects are prevented from being superimposed on one another so that all of the objects within the surveillance video may be checked by visual inspection, and a summarized video which is shorter in time than an original video is generated.

BACKGROUND ART

In recent years, with the rapid development of electronics and communication technologies, development of camera technologies, and spread of smartphones, an amount of collected video data has been rapidly increased, and an amount of information generated into multimedia data such as image data, video data, and voice data has also been increased tremendously.

In reproducing stored information as a video, conventionally, when searching for recorded content after recording is finished using a video-recording camera, recorded videos are sequentially played back, which requires a long time and concentration of the user. In order to prevent such a problem and to reduce the searching time, there is a method of searching using a fast forwarding method. However, since the digital recording method shows a video without instantaneous frames, there are problems in that a recorded object is missed or the video is not natural. Particularly, in the case of a surveillance video such as closed circuit television (CCTV), a large effort is required for the user because it is necessary to watch a video, which has not been recorded for observation purpose, for a long period of time.

As a result, in most surveillance systems nowadays, a person directly observes a video to search for a target object without intelligent analysis of surveillance video. This process requires a very long time and causes extreme fatigue of an observer. Also, when the user plays a video at a higher speed or skips scenes in videos to reduce the searching time, there is a problem in that a risk of missing a target object is high.

DISCLOSURE

Technical Problem

The present invention is directed to providing an apparatus and method for generating a compact video and a recording medium on which a computer program is recorded in which a foreground and a background are separated from a surveillance video obtained through a surveillance camera, objects which correspond to the foreground are temporally rearranged, wherein the objects are prevented from being superimposed on one another so that all of the objects within the surveillance video may be checked by visual inspection, and a summarized video which is shorter in time than an original video is generated.

Technical Solution

According to an embodiment of the present invention, a compact video generation apparatus according to an embodiment of the present invention includes an object extractor configured to separate a captured image into a background image and a foreground image and extract objects included in the separated foreground image, an object collision calculator configured to, when a collision occurs between the extracted different objects, generate occupation matrices with changed scales from the foreground image and calculate the collision using computation between the occupation matrices of the different objects, an object rearranger configured to rearrange the objects within a range in which a collision does not occur visually, and a summarized video generator configured to compose the captured background image and the rearranged objects to generate a summarized video.

The objects may be in a tubular form in which images displayed on a plurality of video frames are connected.

The occupation matrices may be generated from approximations of the foreground image.

The occupation matrices may be formed of pixels arranged in a plurality of rows and columns, and the computation between the occupation matrices may be calculated only between pixels which correspond to different objects.

The computation between the occupation matrices may be performed by temporally shifting an occupation matrix constituting any one object and calculating a pixel which corresponds to an occupation matrix constituting another object at the same time.

The occupation matrices may be computed using convolution.

The convolution of the occupation matrices may be calculated through a fast Fourier transform.

The object may be adjusted to be relatively larger when an importance thereof is high according to a standard which is given by a user or preset.

The importance may be set in consideration of a time at which the object has appeared, a color of the object, or a traveling direction of the object.

When the number of objects appearing in the foreground image is greater or less than a pre-defined reference value, a size of the object may be adjusted relative thereto.

According to another embodiment of the present invention, a compact video generation method according to the present invention includes separating a captured image into a background image and a foreground image and extracting objects included in the separated foreground image, when a collision occurs between the extracted different objects, generating occupation matrices with changed scales from the foreground image and calculating the collision using computation between the occupation matrices of the different objects, rearranging the objects within a range in which a collision does not occur visually, and composing the captured background image and the rearranged objects to generate a summarized video.

According to still another embodiment of the present invention, there is provided a recording medium on which a computer program for performing the compact video generation method is recorded.

Advantageous Effects

According to an embodiment of the present invention, a foreground and a background can be separated from a surveillance video obtained through a surveillance camera, objects which correspond to the foreground can be temporally rearranged, wherein the objects are prevented from being superimposed on one another so that all of the objects within the surveillance video can be checked by visual inspection, and a summarized video which is shorter in time than an original video can be generated.

Therefore, the surveillance video can be analyzed with high accuracy while time required for observing the surveillance video is minimized, and a level of fatigue of a user observing the surveillance video can be reduced.

MODES OF THE INVENTION

Figure 1:
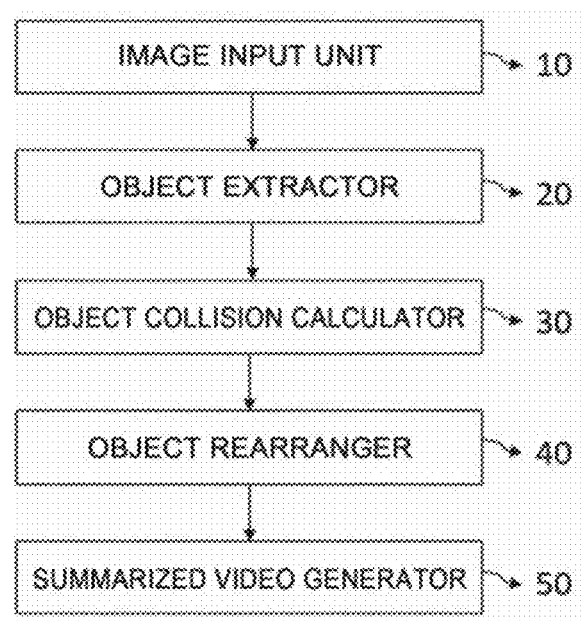
FIG. 1 is a block diagram of a compact video generation apparatus according to an embodiment of the present invention.

Since various modifications may be made to the present invention and the present invention may have various embodiments, particular embodiments will be illustrated in the drawings and described in the detailed description below. However, this does not limit the present invention to the particular embodiments, and all modifications, equivalents, and substitutes included in the spirit and scope of the present invention should be construed as belonging to the present invention. In describing the present invention, when detailed description of known art related to the present invention is deemed to blur the gist of the present invention, the detailed description thereof will be omitted.

Terms including ordinals such as first and second may be used to describe various elements, but the elements are not limited by the terms. The terms are only used for the purpose of distinguishing one element from another element.

Terms used in the application are merely used to describe particular embodiments and are not intended to limit the present invention. A singular expression includes a plural expression unless the context clearly indicates otherwise. In the application, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

Hereinafter, an embodiment of an apparatus and method for generating a compact video and a recording medium on which a computer program is recorded according to the present invention will be described in detail with reference to the accompanying drawings. In describing with reference to the accompanying drawings, the same reference numerals will be assigned to the same or corresponding elements, and a repetitive description thereof will be omitted.

Figure 2:
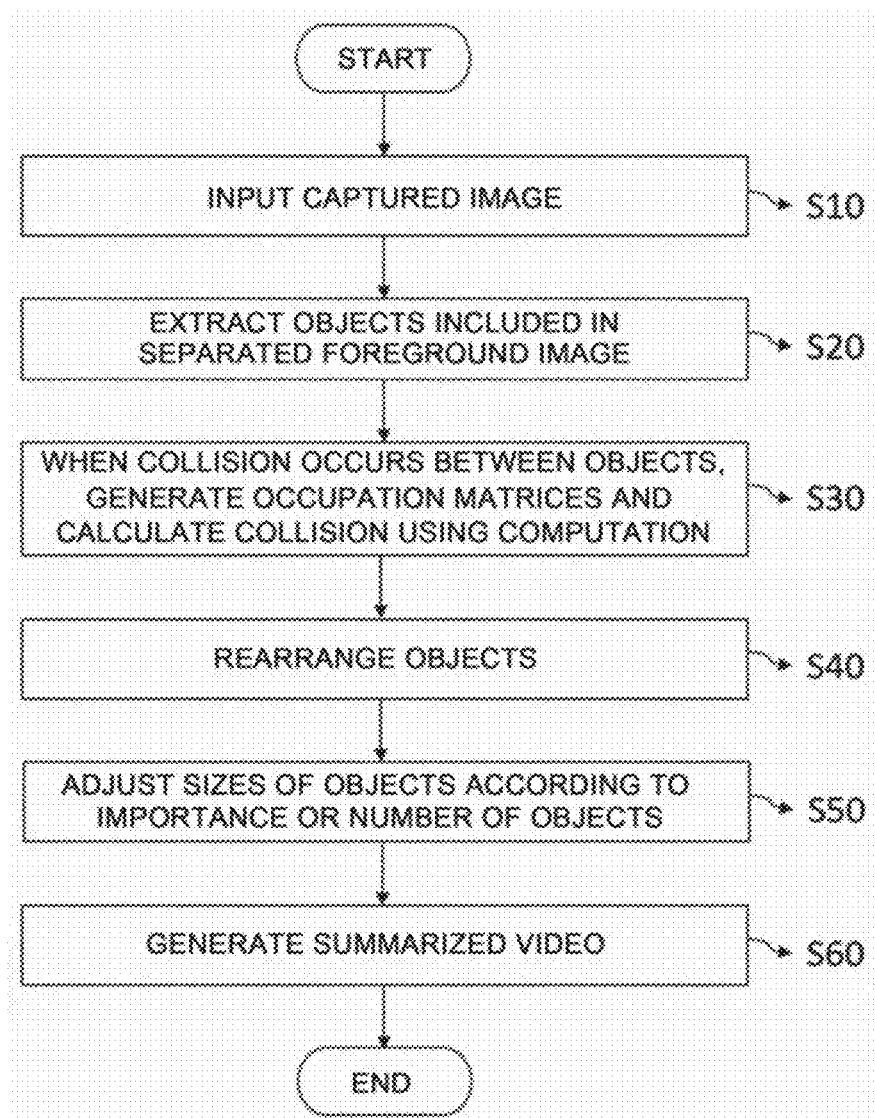
FIG. 2 is a flowchart of a compact video generation method according to an embodiment of the present invention.

FIG. 1 is a block diagram of a compact video generation apparatus according to an embodiment of the present invention, and FIG. 2 is a flowchart of a compact video generation method according to an embodiment of the present invention.

According to FIGS. 1 and 2, a compact video generation apparatus according to an embodiment of the present invention may include an object extractor 20 configured to separate a captured image into a background image and a foreground image and extract objects included in the separated foreground image, an object collision calculator 30 configured to, when a collision occurs between the extracted different objects, generate occupation matrices with changed scales from the foreground image and calculate the collision using computation between the occupation matrices of the different objects, an object rearranger 40 configured to rearrange the objects within a range in which a collision does not occur visually, and a summarized video generator 50 configured to compose the captured background image and the rearranged objects to generate a summarized video.

An image input unit 10 serves to capture an image and input captured image information (S10). That is, a fixed type surveillance camera installed for surveillance, a video, or the like, may be used as the image input unit 10. Also, the object extractor 20, the object collision calculator 30, the object rearranger 40, and the summarized video generator 50, excluding the image input unit 10, may substantially be a recording medium on which a computer program is recorded. The image input unit 10 may be configured using a separate surveillance camera, surveillance video, or the like as described above or may also be directly included in the recording medium and configured to input a captured image.

The captured image may be classified into a background image and a foreground image, and in the present embodiment, objects included in the separated foreground image are extracted (S20).

Figure 3:
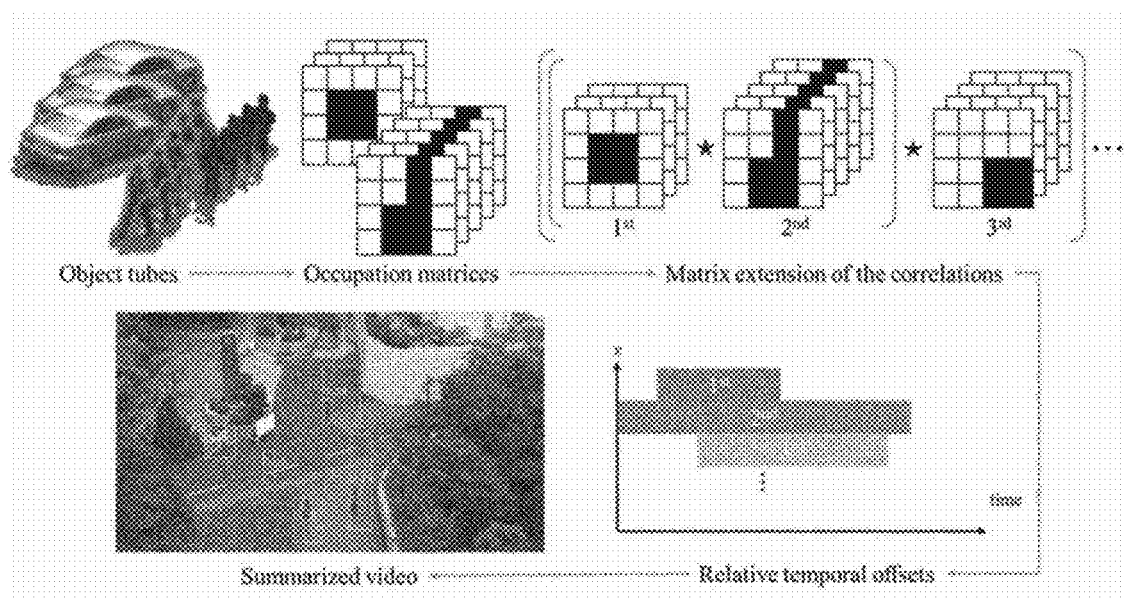
FIG. 3 is a view illustrating a process of generating a summarized video according to the compact video generation method according to an embodiment of the present invention.

For example, the object extractor 20 may extract images of objects using a gaussian mixture model (GMM) algorithm. The images extracted by the object extractor 20 may be shown in the form of a plurality of frames as illustrated in FIG. 3. When the images displayed on a plurality of video frames are connected, the form of the objects may be transformed into a tubular form having a three-dimensional volume.

Next, when a collision occurs between the objects, the object collision calculator 30 generates occupation matrices and calculates the collision using computation (S30). A collision does not occur between objects when different objects visually appear in different positions within an image, but the collision occurs between the objects when the objects appear in even slightly similar positions. When the collision occurs, a user observing the image is unable to clearly view some parts of the objects and may miss an important information. Therefore, to prevent this in the present embodiment, objects are rearranged through a collision calculation when a collision occurs between the objects.

In the present embodiment, the occupation matrices may be computed using convolution. Of course, the computing of the occupation matrices is not limitedly performed by the convolution and may also be performed using various other techniques such as correlations.

Figure 4:
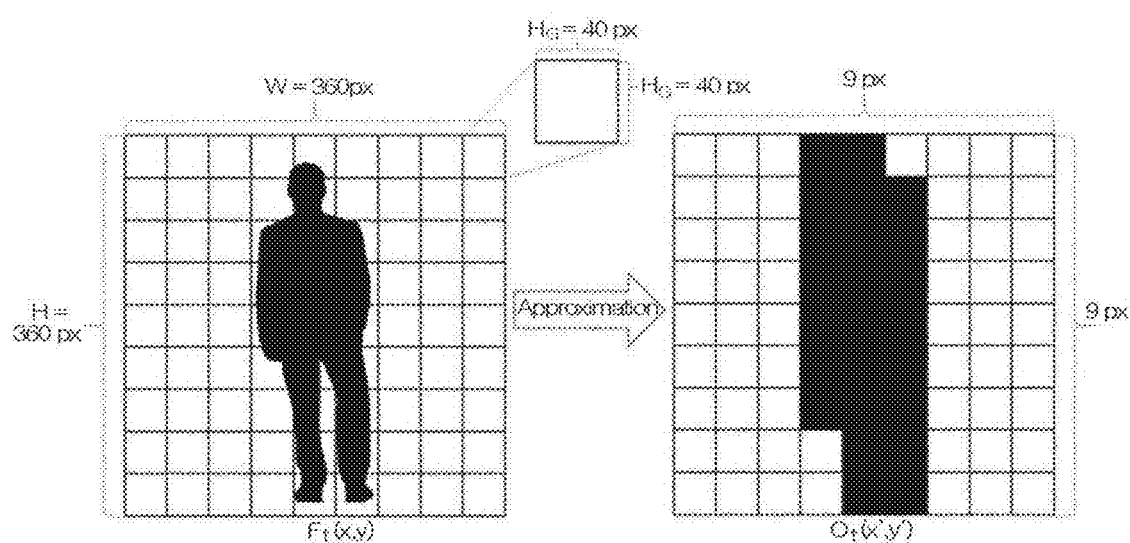
FIG. 4 is a view illustrating generating an occupation matrix from a foreground image.

FIG. 4 is a view illustrating generating an occupation matrix from a foreground image.

Referring to FIG. 4, the figure at the left illustrates a person shown as a foreground image, and the figure at the right illustrates an occupation matrix generated from the object. The occupation matrix is formed of pixels arranged in a plurality of rows and columns and is formed of pixel units having a smaller scale than a resolution of an actual image in which the object is displayed. That is, although a single large pixel of the object corresponds to a single pixel of the occupation matrix, a single large pixel of an actual object is formed of 40×40, i.e., 1600, pixels.

In addition, the occupation matrix as a whole is formed of 9×9 pixels (as an example), and such an occupation matrix is generated from approximations of the foreground image. As a result, the occupation matrix schematically shows a space occupied by the corresponding object in space and time. The reason for generating the occupation matrix from the approximations in the present embodiment as described above is to address a problem of the prior art in that an algorithm for calculating a collision between objects takes a very long time. That is, when, as described above, an occupation matrix is generated from approximations from a foreground image, and a collision between objects is calculated on the basis of the occupation matrix, since a speed of a collision calculation algorithm becomes faster, a task of generating a summarized video may be accelerated.

In addition, in the present embodiment, to further accelerate a calculation of a collision between objects, convolution between occupation matrices is configured to be calculated in parallel. This will be described below with reference to FIGS. 5 to 10.

Figure 5:
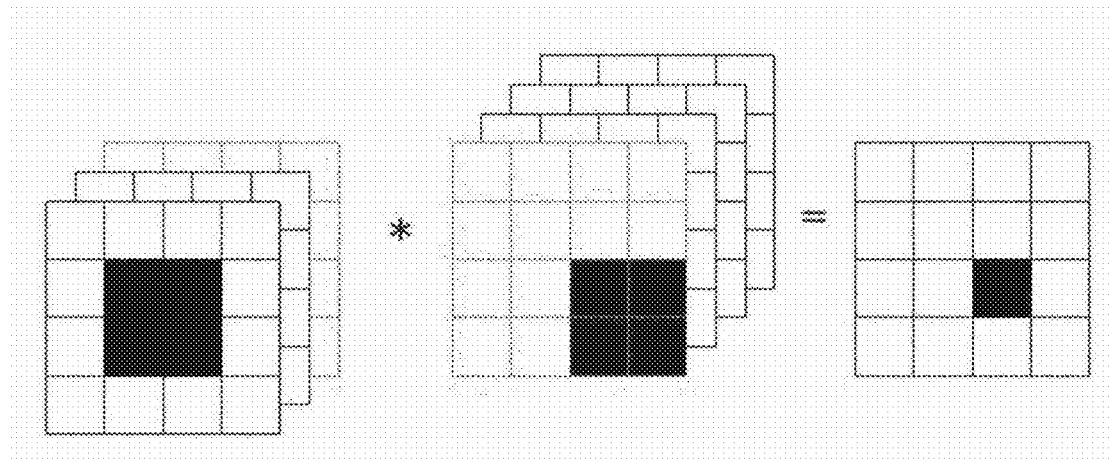
FIGS. 5 to 10 are views illustrating a process of calculating a collision using convolution between occupation matrices.
Figure 6:
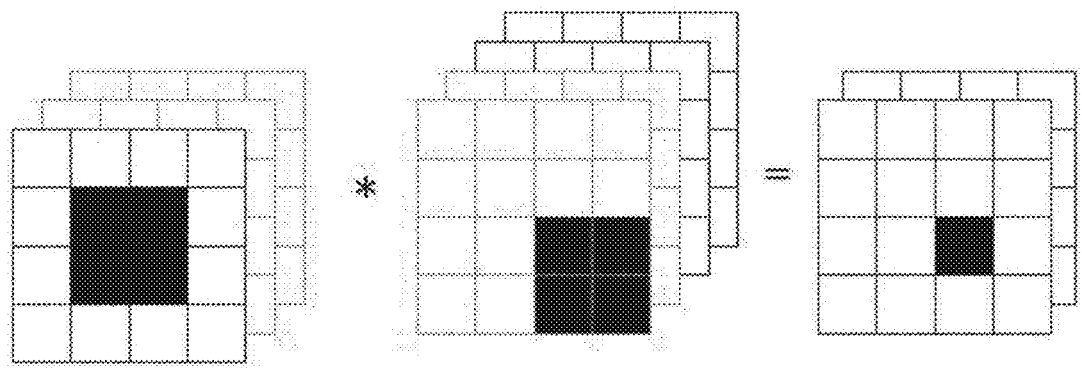
Figure 7:
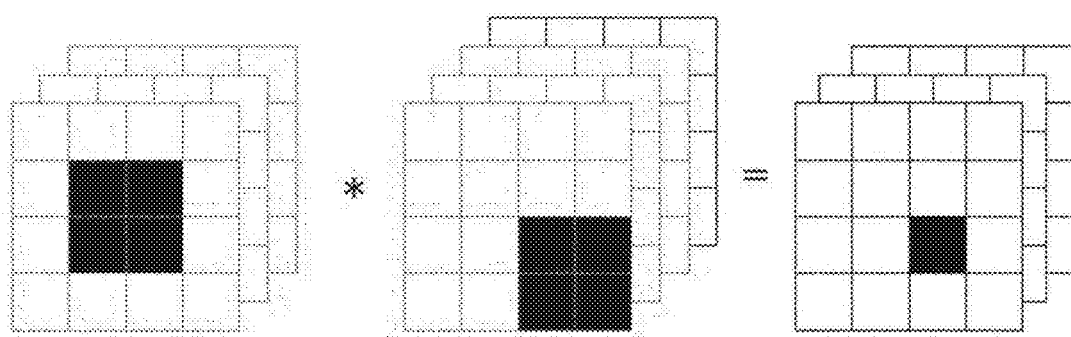
Figure 8:
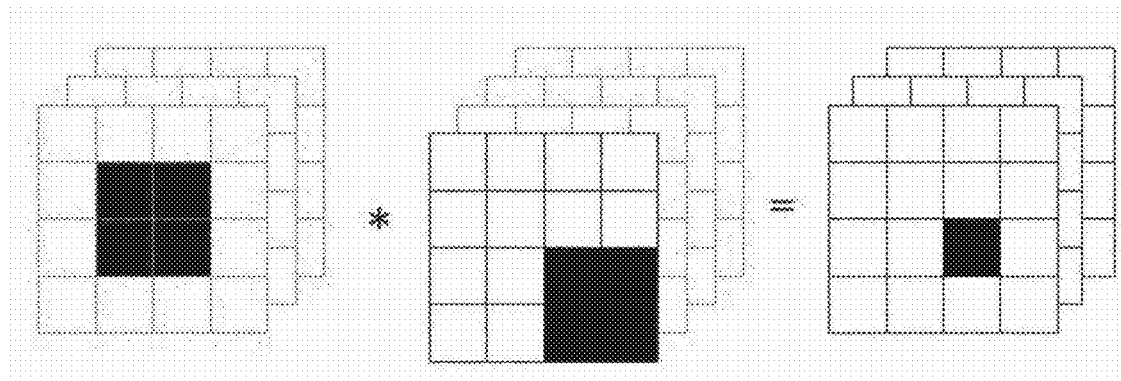
Figure 9:
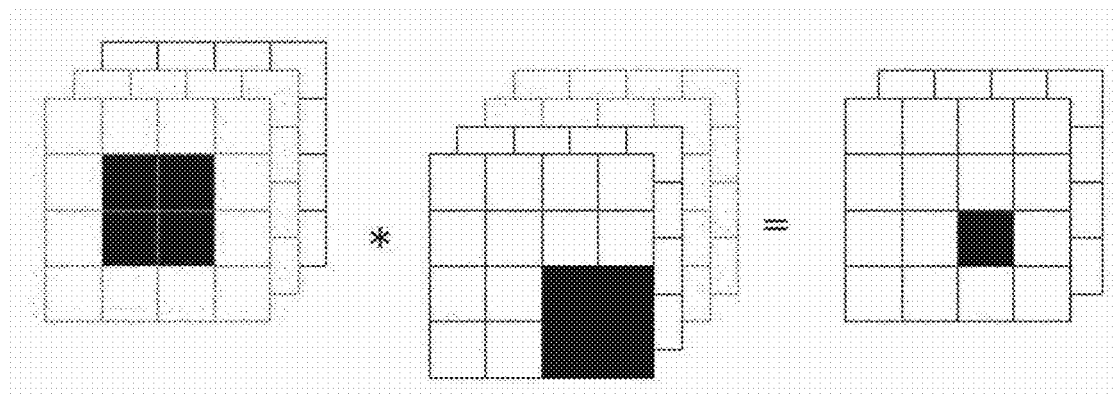
Figure 10:
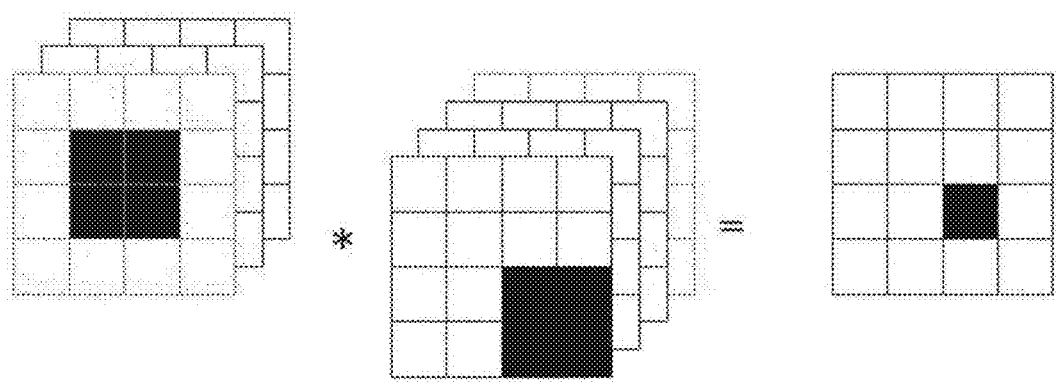

Referring to FIG. 5, it is assumed that three occupation matrices are generated for a first object as shown at the left, and four occupation matrices are generated for a second object as shown at the right.

In this case, the first object and the second object are arranged so that one of the occupation matrices of the first object and one of the occupation matrices of the second object are superimposed on each other, and then convolution is performed between collided occupation matrices. It is important that the convolution between the occupation matrices be only performed between pixels which correspond to each other. That is, since the convolution is only calculated between the pixels corresponding to each other, when viewed as a whole, convolution is calculated in parallel between each pair of pixels. When the convolution is obtained by the parallel calculation between the pixels of the occupation matrices as described above, since the speed of the collision calculation algorithm is improved, there is an advantage in that a summarized video may be obtained within a shorter amount of time. Meanwhile, the convolution between the occupation matrices may be more quickly calculated through a fast Fourier transform.

Referring to FIGS. 6 to 10, when convolution of a single collided occupation matrix is calculated as illustrated in FIG. 5, convolution is calculated between an occupation matrix constituting a first object and an occupation matrix constituting a second object while the occupation matrix constituting the first object is temporally shifted. FIGS. 6 to 10 show a process of calculating the colliding occupation matrices while the occupation matrix constituting the first object is temporally shifted by an interval between the occupation matrices.

According to the above-described parallel computation, input images may be analyzed and a summarized video may be generated at a high speed without using limitative methods such as a simple background separation algorithm (temporal median), temporal sampling (performed in units of N frames for temporal rearrangement), file division (algorithm is applied by dividing image sections according to the number of objects to reduce the number of objects handled in a rearrangement algorithm), and the like which are selected in the prior art to reduce computation time.

The object rearranger 40 serves to rearrange objects within a range in which a collision does not occur visually (S40). The object rearranger 40 rearranges objects on the basis of a result obtained through a calculation of a collision between objects, thereby preventing the objects from being superimposed visually on the screen.

Next, the summarized video generator 50 composes the captured background image and the rearranged objects to generate a summarized video (S60). Since the rearranged objects have been extracted from the foreground image, the rearranged objects are composed with the previously-captured background image to generate a summarized video.

Figure 11:
FIG. 11 is a view illustrating comparing a video before summarizing and a video after summarizing.
Figure 11:

FIG. 11 is a view illustrating comparing a video before summarizing and a video after summarizing.

Referring to FIG. 11, before summarizing, it is difficult to observe a video within a short amount of time because the number of objects shown in a single image is small, but, after summarizing, the number of objects shown in a single image is large such that a reproduction time of the whole video is short, and it is possible to observe the video within a short amount of time. Referring to the summarized video in FIG. 3, by indicating time at which an object appears at a portion adjacent to the corresponding object, an object of interest may be reproduced at the corresponding time in the original video to more deeply observe the object.

Figure 12:
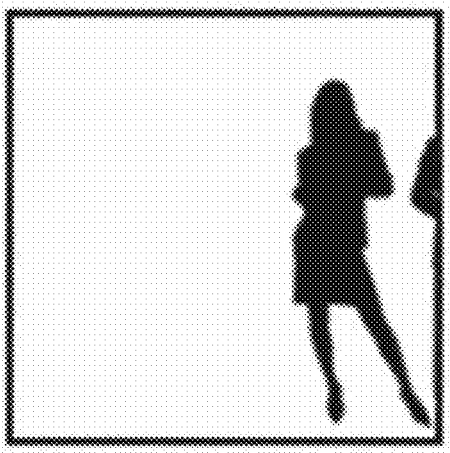
FIG. 12 is a view illustrating adjusting a size of an object in consideration of an importance thereof.
Figure 12:
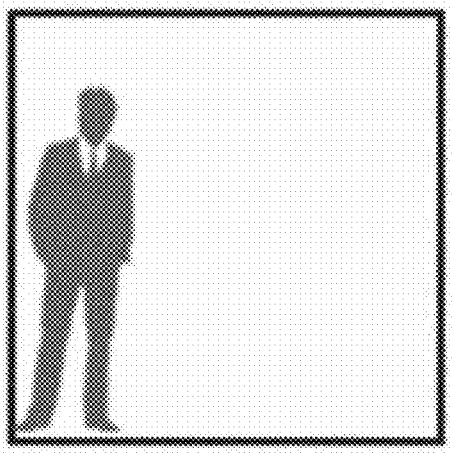
Figure 12:
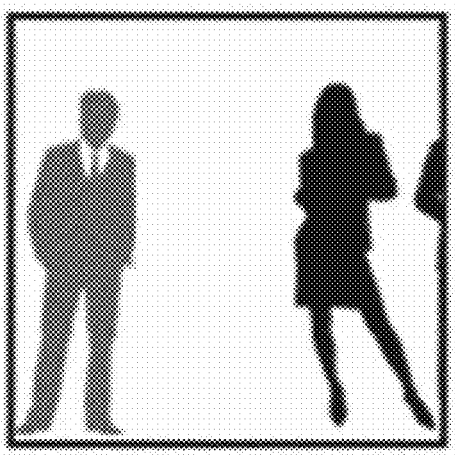
Figure 12:
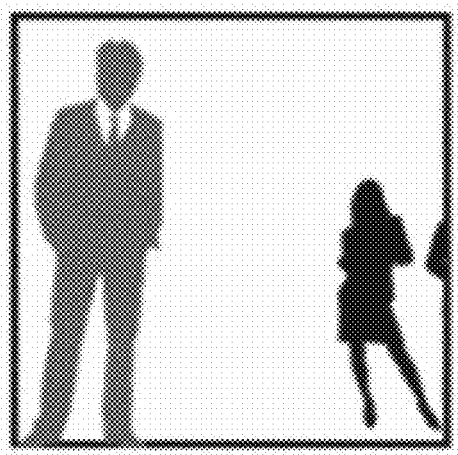
Figure 13:
FIG. 13 is a view illustrating adjusting a size of an object in consideration of the number of objects.
Figure 13:
Figure 13:
Figure 13:

Next, FIG. 12 is a view illustrating adjusting a size of an object in consideration of an importance thereof, and FIG. 13 is a view illustrating adjusting a size of an object in consideration of the number of objects.

Referring to FIG. 12, when an importance of an object is high according to a standard which is given by a user or preset, the object may be adjusted to be relatively larger (S50). Here, the importance may be set in consideration of a time at which the object has appeared, a color of the object, or a traveling direction of the object and may be used along with a filtering function.

For example, the standard given by the user may be, when the user sets a higher importance for an object including a particular color, the object including the corresponding color is displayed to be relatively larger so that the object may be more easily observed by the user.

In addition, the preset standard may be, when a higher importance is set for an object that appears for 10 minutes or more in the whole video, the object appearing for 10 minutes or more is displayed to be relatively larger so that the object may be more easily observed by the user.

The above-described importance is merely an example, and of course, the importance may be set in various other ways for a specific purpose.

Referring to FIG. 13, when the number of objects appearing in a foreground image is greater or less than a predefined reference value, sizes of the objects may be relatively adjusted (S50). The reason for this is because when, for example, the number of objects appearing on the screen is large (traffic congestion, crowded amusement park, etc.), it is not possible to achieve an effect of a summarized video when objects are arranged not to collide with one another. Therefore, when the objects are arranged by adjusting the sizes of the objects to be relatively smaller, since a larger number of objects are displayed on a single screen, the user may more effectively observe the video.

Exemplary embodiments according to the present invention have been described above. However, those of ordinary skill in the art should understand that various modifications and changes may be made to the present invention within the scope not departing from the idea and range of the present invention.

The invention claimed is:

1. An apparatus for generating a compact video, the apparatus comprising:
    an object extractor that separates a captured image into a background image and a foreground image and extract objects included in the separated foreground image;
    an object collision calculator that, when a collision occurs between the extracted different objects, generates occupation matrices with changed scales from the foreground image and calculates the collision using computation between the occupation matrices of the different objects;
    an object rearranger that rearranges the objects within a range in which a collision does not occur visually; and
    a summarized video generator that composes the captured background image and the rearranged objects from the object rearranger to generate a summarized video.

2. The apparatus of claim 1, wherein the objects are in a tubular form in which images displayed on a plurality of video frames are connected.

3. The apparatus of claim 1, wherein the occupation matrices are generated from approximations of the foreground image.

4. The apparatus of claim 1, wherein the occupation matrices are formed of pixels arranged in a plurality of rows and columns, and the computation between the occupation matrices is calculated only between pixels which correspond to different objects.

5. The apparatus of claim 4, wherein the computation between the occupation matrices is performed by temporally shifting an occupation matrix constituting any one object and calculating a pixel which corresponds to an occupation matrix constituting another object at the same time.

6. The apparatus of claim 1, wherein the occupation matrices are computed using convolution.

7. The apparatus of claim 6, wherein the convolution of the occupation matrices is calculated through a fast Fourier transform.

8. The apparatus of claim 1, wherein the object is adjusted to be relatively larger when an importance thereof is high according to a standard which is given by a user or preset.

9. The apparatus of claim 8, wherein the importance is set in consideration of a time at which the object has appeared, a color of the object, or a traveling direction of the object.

10. The apparatus of claim 1, wherein, when the number of objects appearing in the foreground image is greater or less than a pre-defined reference value, a size of the object is adjusted relative thereto.

11. A method for generating a compact video, the method comprising:
    separating a captured image into a background image and a foreground image and extracting objects included in the separated foreground image;
    when a collision occurs between the extracted different objects, generating occupation matrices with changed scales from the foreground image and calculating the collision using computation between the occupation matrices of the different objects;
    rearranging the objects within a range in which a collision does not occur visually, using an object rearranger; and
    composing the captured background image and the rearranged objects from the object rearranger to generate a summarized video.

12. The method of claim 11, wherein the occupation matrices are generated from approximations of the foreground image.

13. The method of claim 11, wherein the occupation matrices are formed of pixels arranged in a plurality of rows and columns, and the computation between the occupation matrices is calculated only between pixels which correspond to different objects.

14. The method of claim 13, wherein the computation between the occupation matrices is performed by, while temporally shifting an occupation matrix constituting any one object, calculating a pixel which corresponds to an occupation matrix constituting another object.

15. The method of claim 11, wherein the occupation matrices are computed using convolution.

16. The method of claim 15, wherein the convolution of the occupation matrices is calculated through a fast Fourier transform.

17. The method of claim 11, further comprising adjusting the object to be relatively larger when an importance thereof is high according to a standard which is given by a user or preset.

18. The method of claim 17, wherein the importance is set in consideration of a time at which the object has appeared, a color of the object, or a traveling direction of the object.

19. The method of claim 11, further comprising, when the number of objects appearing in the foreground image is greater or less than a pre-defined reference value, adjusting a size of the object relative thereto.

* * * * *